J. H. TOBIN.
FRUIT JAR HOLDER.
APPLICATION FILED MAR. 20, 1920.
1,360,826.
Patented Nov. 30, 1920.
2 SHEETS—SHEET 1.
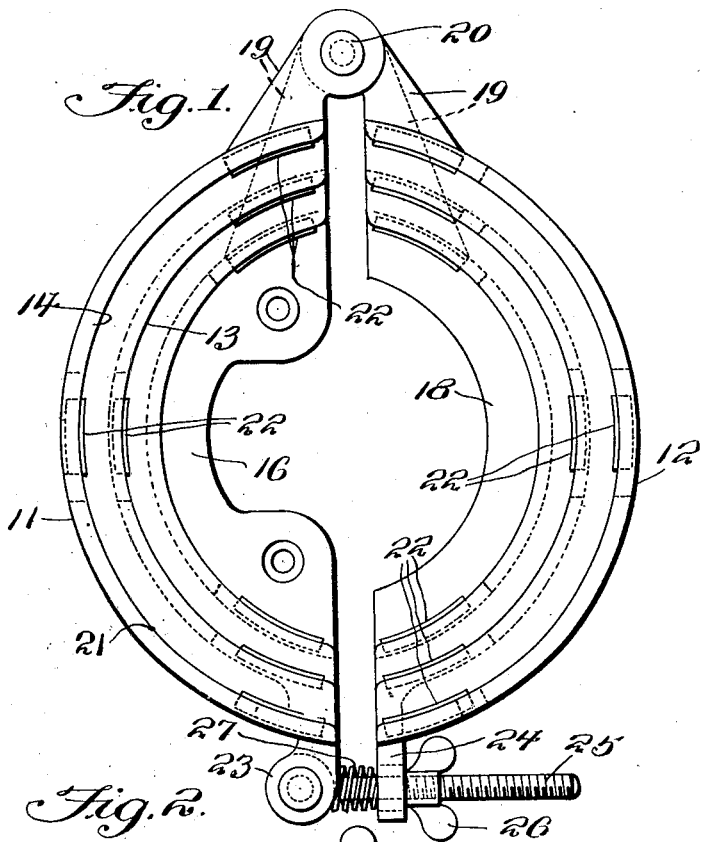
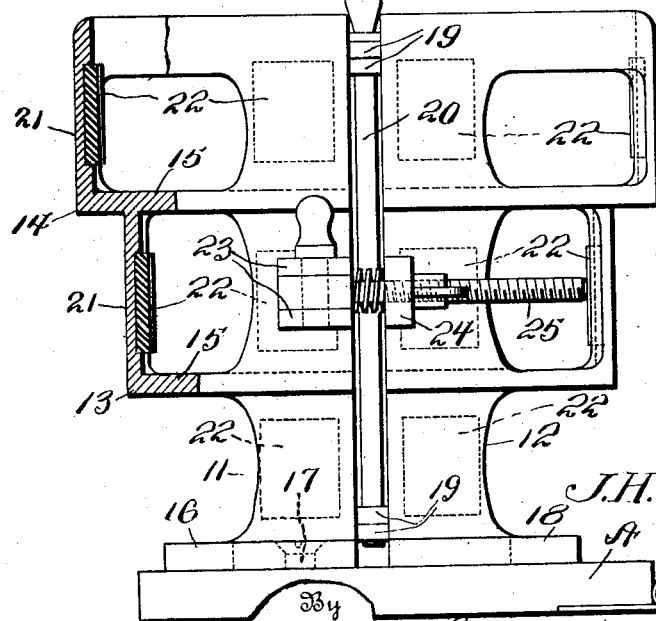
Inventor
J. H. Tobin,
By Geo. P. Kimmel
Attorney

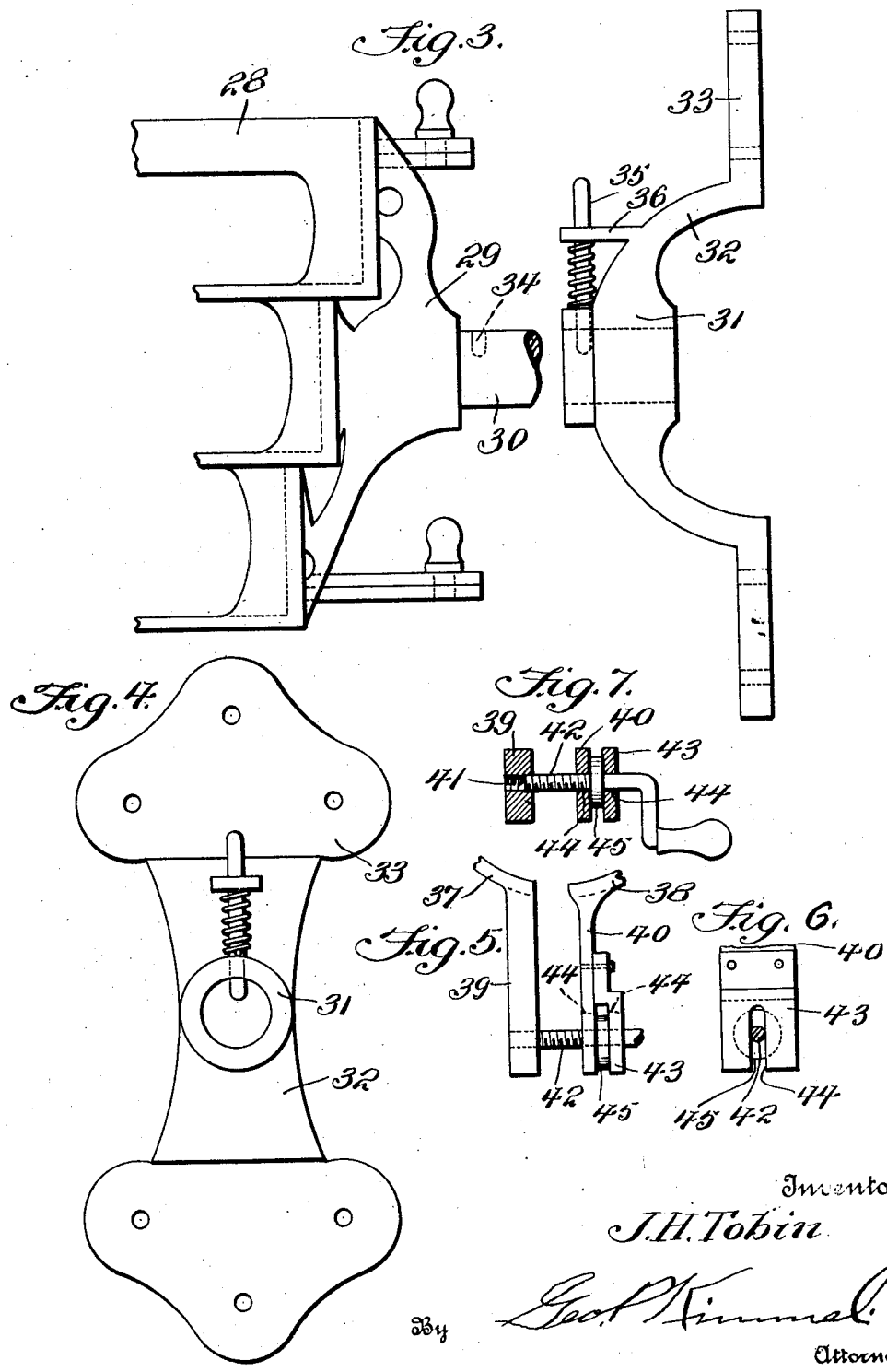

UNITED STATES PATENT OFFICE.

JAMES H. TOBIN, OF ERIE, PENNSYLVANIA.

FRUIT-JAR HOLDER.

1,360,826.
Specification of Letters Patent. Patented Nov. 30, 1920.

Application filed March 20, 1920. Serial No. 367,425.

*To all whom it may concern:*

Be it known that I, JAMES H. TOBIN, a citizen of the United States, residing at Erie, in the county of Erie and State of Pennsylvania, have invented certain new and useful Improvements in Fruit-Jar Holders, of which the following is a specification.

The invention relates to a fruit jar holder and has for its primary object to provide a holder of this character, wherein a fruit jar, can or other receptacle can be conveniently and easily clamped therein so as to positively hold the same, whereby the cover or top thereof can be easily removed therefrom or placed thereon, thus eliminating the necessity of holding the jar, can or other receptacle in the hands when in the act of removing the cap or cover therefrom or replacing thereof upon the same.

Another object of the invention is the provision of a holder of this character, wherein the same is constructed and arranged to accommodate different sizes of jars, cans or other like receptacles and that will firmly clamp the same for the positive holding thereof to permit the easy application of the cover or cap or its removal, the holder being of novel form so that the same may be mounted upon a support for the convenient use thereof.

A further object of the invention is the provision of a holder of this character, wherein the jar, can or receptacle when held therein after the placing of the cover or cap thereon can be turned into inverted position to ascertain whether the contents will leak therefrom, and thus the manual handling of the jar, can or receptacle is entirely eliminated during the application of the cover or cap or removal.

A still further object of the invention is the provision of a holder of this character, wherein the clamping sections thereof can be adjusted relative to each other to assure the positive gripping of a can, jar or other like receptacle when placed within the holder and in this manner avoiding any possibility of the turning of the said can, jar or receptacle when the cover or cap thereof is being applied thereto or taken therefrom.

A still further object of the invention is the provision of a holder of this character, which is extremely simple in construction, capable of being readily and easily cleaned, convenient for the firm holding of a jar, can or receptacle, readily adjusted for accommodating different sizes of cans, jars or receptacles, thoroughly reliable and efficient in its purpose and inexpensive to manufacture.

With these and other objects in view, the invention consists in the features of construction, combination and arrangement of parts, as will be hereinafter fully described, illustrated in the accompanying drawings and pointed out in the claim hereunto appended.

In the accompanying drawings.

Figure 1 is a top plan view of a holder constructed in accordance with the invention.

Fig. 2 is a side elevation thereof, the same being partly broken away to show the inner side of one of the sections thereof.

Fig. 3 is a fragmentary side elevation showing a slight modification of holder, adapted for mounting upon a wall.

Fig. 4 is a plan view of the wall bracket for the modified form of holder.

Fig. 5 is a fragmentary top plan view showing a modified form of adjustable fastener for the sections of the holder.

Fig. 6 is a side elevation thereof showing the adjusting screw in section.

Fig. 7 is a vertical transverse sectional view showing the adjusting screw and adjunct parts in elevation.

Similar reference characters indicate corresponding parts throughout the several views in the drawings.

Referring to the drawings in detail, particularly Figs. 1 and 2 thereof, the holder comprises a base A, preferably made from wood and in this instance of rectangular shape, although the same may be made from any other material and of any other desirable shape. The base A is connected with a table or other character of support through the medium of a hinge 10 connected to the table or support and to said base A at one end thereof so that the base can be swung from horizontal position superimposed upon the table or support to a vertical position for a purpose presently described.

Carried upon the base A are semi-circular shaped stationary and movable clamping sections 11 and 12 respectively, which together constitute the body of the holder and these sections are formed with the stepped portions 13 and 14 respectively providing spaced rest flanges 15 interiorly of the sections for jars, cans, receptacles or the like when placed within the holder, the stepped portion 13 being of less size than the stepped portion 14 of said sections so that different sizes of jars, cans, receptacles or the like can be accommodated within the holder for the clamping thereof.

The section 11 at its bottom is formed with a base rim 16 through which are passed suitable fasteners 17 of said section 11 to the base A as is shown by dotted lines in Fig. 2 of the drawings, while the base flange 18 on the bottom of the section 12 is free from the base A, these sections being formed at their rear ends with pivot ears 19 receiving a pivot pin 20 so that the section 12 is swingingly connected to the section 11 for the opening and closing of the movable section 12 relative to said stationary section to permit the easy introduction of a jar, can or receptacle in the holder or its removal therefrom.

Mounted in the side walls 21 of the stepped portions 13 and 14 of the sections 11 and 12 interiorly thereof at intervals are friction pieces 22, made preferably from fabric and rubber, so that when a jar, can or receptacle is clamped between the sections 11 and 12 the same will be held fast and prevented from slipping.

Formed on the front ends of the sections 11 and 12 are bifurcated and pivoted ears 23 and 24 respectively, the bifurcated ear being fitted with a pivoted adjusting screw 25, which latter is adapted to slide through the perforation in the perforated ear 24 and carries thereon a winged adjusting nut 26 so that the movable section 12 can be shifted toward the stationary section 11 on the adjustment of the nut 26 by hand, the screw 25 being surrounded by a coiled expansion spring 27 which acts to separate the movable section 12 from the section 11 on the loosening of the nut 26 upon the screw 25 as will be clearly apparent.

In the use of the holder the jar, can or other receptacle of a selected size is placed within the holder so that the lower portion of said jar, can or receptacle will be brought into position between the sections 11 and 12 so as to rest upon the flange 15 of the stepped portion of said sections correspondingly to the size of the jar, can or receptacle and thereafter the movable section 12 is adjustably connected to the stationary section 11 by the winged nut being moved in one direction upon the adjusting screw 25 so that the can, jar or receptacle will be firmly clamped between the sections 11 and 12 of the holder and in this manner the cap or cover can be readily and conveniently placed upon said jar, can or receptacle or removed therefrom without requiring the hand clamping of said jar, can or receptacle as is usual. Now after the cap or cover has been applied to the jar, can or receptacle and it is desired to ascertain whether or not the contents will leak from the jar, can or receptacle it is only necessary to turn the base A from normal horizontal position to a substantially vertical position thereby sufficiently moving the jar, can or receptacle to a side position, whereby it can be determined whether or not the contents will leak from the mouth of said jar, can or receptacle after the cap or cover has been applied thereto.

In Figs. 3 and 4 of the drawings there is shown a slight modification of holder, wherein the stationary section 28 of the body of the holder has formed at its rear side an enlarged boss 29 having a stub pivot 30 for engagement in a socket or sleeve 31 formed medially of the arched portion of a wall bracket 33 which is adapted to be secured to a wall in any suitable manner so that the holder can be hung thereon. The pivot stub 30 is provided with a latch receiving recess 34 to accommodate a spring held hand releasing latching pin 35 mounted in a guide 36 on the arched portion 32 of the bracket 33 and working through the socket collar 31, so that the holder can be locked in normal upright position and on releasing the latching pin 35 it can be turned to an inverted position as will be clearly obvious.

In Figs. 5, 6 and 7 of the drawings there is shown a slight modification of an adjusting screw for use with the holder, wherein the stationary and movable sections 37 and 38 of the body of the holder have formed at their ends the ears 39 and 40 respectively, the ear 39 being provided with a threaded hole 41 for the adjusting screw 42, the latter being loosely fitted in the ear 40 which carries an offset keeper 43 exteriorly secured thereto, the ear 40 and keeper 43 being formed with alining slots 44 which open through the free edges thereof so that the screw 42 can be engaged therein, and removed therefrom. The screw 42 has formed thereon a hub 45, which is adapted to fit between the ear 40 and the keeper 43 so that in this manner when the screw 42 has been thus fitted it will be swiveled on the ear 40 and on the turning of the screw 42 the same can be adjusted in the threaded hole 41 in the ear 39 thereby bringing the movable section 38 toward or away from the stationary section 37 of the body of the holder for the clamping and unclamping of a jar, can or receptacle between said sections of the holder or the removal of said jar, can or receptacle therefrom.

It is of course to be understood that any number of stepped portions 13 and 14 can be formed in the sections of the body of the holder, so that a variable number of sizes of jars, cans or receptacles can be clamped in the holder.

In the modified form of holder shown in Figs. 3 and 4 of the drawings it will be clearly apparent that the body of the holder can be turned from normal upright position to an inverted position to ascertain after the applying of the cap or cover to the jar, can or receptacle whether or not the contents thereof will leak therefrom through the capped or covered end thereof.

From the foregoing it is believed that the construction and manner of use of the holder will be clearly understood and therefore a more extended explanation has been omitted.

What is claimed is:

A holder of the character described comprising stationary and movable body sections pivotally connected together, said sections being formed with stepped portions, means for adjusting the movable section relative to the stationary section, friction pieces carried on the walls of the stepped portions of the sections at the inner sides thereof, and means for swingingly supporting the sections of the body.

In testimony whereof, I affix my signature hereto.

JAMES H. TOBIN.